US012775122B2

(12) United States Patent
Laloyaux et al.

(10) Patent No.: US 12,775,122 B2
(45) Date of Patent: Oct. 27, 2026

(54) HEAD UP DISPLAY SYSTEM

(71) Applicant: AGC GLASS EUROPE, Louvain-la-Neuve (BE)

(72) Inventors: Xavier Laloyaux, Gosselies (BE); Philippe Roquiny, Moustier-sur-Sambre (BE); Kadosa Hevesi, Namur (BE)

(73) Assignee: AGC GLASS EUROPE, Louvain-la-Neuve (BE)

(*) Notice: Subject to any disclaimer, the term of this patent is extended or adjusted under 35 U.S.C. 154(b) by 215 days.

(21) Appl. No.: 18/560,721

(22) PCT Filed: May 25, 2022

(86) PCT No.: PCT/EP2022/064177

§ 371 (c)(1),
(2) Date: Nov. 14, 2023

(87) PCT Pub. No.: WO2022/253659

PCT Pub. Date: Dec. 8, 2022

(65) Prior Publication Data

US 2024/0248239 A1 Jul. 25, 2024

(30) Foreign Application Priority Data

Jun. 2, 2021 (EP) .................................... 21177439

(51) Int. Cl.

| | |
|---|---|
| ***G02B 1/11*** | (2015.01) |
| ***B32B 17/10*** | (2006.01) |
| ***B60J 1/00*** | (2006.01) |
| ***B60K 35/23*** | (2024.01) |
| ***B60K 35/28*** | (2024.01) |
| ***B60K 35/40*** | (2024.01) |
| ***C03C 17/34*** | (2006.01) |
| ***C03C 17/36*** | (2006.01) |
| ***G02B 5/30*** | (2006.01) |
| ***G02B 27/01*** | (2006.01) |

(52) U.S. Cl.

CPC .......... *G02B 1/11* (2013.01); *B32B 17/10036* (2013.01); *B32B 17/1011* (2013.01); *B32B 17/10229* (2013.01); *B32B 17/10458* (2013.01); *B32B 17/10761* (2013.01); *B60J 1/001* (2013.01); *B60K 35/23* (2024.01); *B60K 35/425* (2024.01); *C03C 17/3417* (2013.01); *C03C 17/3482* (2013.01); *C03C 17/3618* (2013.01); *C03C 17/3626* (2013.01); *C03C 17/3649* (2013.01); *C03C 17/3657* (2013.01); *G02B 5/3041* (2013.01); *G02B 27/0101* (2013.01); *B32B 2605/00* (2013.01); *B60K 35/28* (2024.01); *G02B 2027/0194* (2013.01)

(58) Field of Classification Search

CPC ........ G02B 1/11; B60K 35/23; B60K 35/425; B32B 17/10036

See application file for complete search history.

(56) References Cited

U.S. PATENT DOCUMENTS

| | | | | |
|---|---|---|---|---|
| 2014/0016043 | A1* | 1/2014 | Chen | H04N 9/3197 349/12 |
| 2019/0064516 | A1 | 2/2019 | Wagner et al. | |
| 2020/0039874 | A1* | 2/2020 | Veerasamy | C03C 17/366 |
| 2020/0081287 | A1* | 3/2020 | Sugawara | G02F 1/133528 |
| 2020/0371355 | A1 | 11/2020 | Wagner et al. | |
| 2020/0379152 | A1* | 12/2020 | Kim | G02B 5/003 |
| 2021/0325672 | A1 | 10/2021 | Fischer et al. | |

FOREIGN PATENT DOCUMENTS

| | | |
|---|---|---|
| CN | 106646874 B | 5/2019 |
| WO | WO 2020/083649 A1 | 4/2020 |

OTHER PUBLICATIONS

International Search Report Issued Sep. 9, 2022, in PCT/EP2022/064177, filed on May 25, 2022, 3 pages.

* cited by examiner

*Primary Examiner* — Lucy P Chien

(74) *Attorney, Agent, or Firm* — Oblon, McClelland, Maier & Neustadt, L.L.P.

(57) ABSTRACT

A coated substrate, including a transparent substrate provided with a p-polarized light reflective coating. The p-polarized light reflective coating contains, in sequence starting from a substrate surface, optionally a first coating containing one or more layers of a high refractive index material, optionally a second coating containing one or more layers of a low refractive index material, a third coating containing one or more layers of a high refractive index material, a fourth coating containing one or more layers of a low refractive index material, and further including at least one first layer of absorbent material.

20 Claims, No Drawings

HEAD UP DISPLAY SYSTEM

CROSS REFERENCE TO RELATED APPLICATIONS

This application is a National Stage entry under 35 U.S.C. § 371 of PCT/EP2022/064177, filed on May 25, 2022, and claims priority to European Patent Application No. EP 21177439.3, filed Jun. 2, 2021. The entire contents of both are incorporated herein by reference.

FIELD OF THE INVENTION

The present invention relates to a coated substrate comprising a transparent substrate provided with a p-polarized light reflective coating, to a laminated glazing and a head up display (HUD) system comprising said coated substrate.

BACKGROUND OF THE INVENTION

Head up display systems, or HUD systems, are widely used in transportation devices to provide information on the vehicle glazing in the viewing area of a viewer or driver of said transportation device.

A wide variety of HUD systems are known. Commonly, a projection system is combined with a partial mirror (a partial reflector and partial window) as the final optical component for forming a projected image viewable by the user. Simultaneously, the user can view other scenes through the partial mirror. The partial mirror is an important component affecting the usability of the display. Generally, the reflectivity of the partial mirror must be sufficient to reflect light from the projector, but the partial mirror must also be sufficiently transparent to provide adequate viewing through it.

Examples of HUD system are provided in CN104267498A for a head up display system comprising a projection light source, laminated glass and a transparent nanometer film, wherein the transparent nanometer film comprises at least one laminated structure of alternating high reflective index layers and low reflective index layers deposited sequentially outwards from the surface of an inner glass board; the projection light source is used for generating p-polarized light, the p-polarized light enters the transparent nanometer film, the reflectivity of the p-polarized light from the transparent nanometer film is not lower than 5%, and the incident angle of the p-polarized light ranges from 42 degrees to 72 degrees. Similar examples of HUD system systems using p-polarized light are provided in CN206147178U and CN204166197U.

Further examples of HUD systems are provided in US2019/064516A1. Examples of projection assembly for a vehicle are provided in WO2020/083649A1.

HUD systems take advantage of a coating or stack of thin layers deposited in the path of the projected light serving to reflect said projected light. The projected light may be polarized, such as s-polarized light, or p-polarized light or the projected light may not be polarized.

When working in HUD systems using p-polarized incident light, the reflectance of p-polarized light (Rp–pol) is considered sufficient when it reaches up to 10%, at an angle of incidence of said p-polarized light of 65°. It is however critical that the total reflection from the dashboard does not impact viewing quality for the driver.

There thus remains a need for p-polarized light reflective coating which provide for optimized reflection of p-polarized light while minimizing reflection from the dashboard, reflecting a clear and sharp image display on a glazing in a HUD system.

SUMMARY OF THE INVENTION

The present invention provides for a coated substrate comprising a transparent substrate provided with a p-polarized light reflective coating comprising, in sequence starting from the substrate surface, a. optionally
    i. a first coating, composed of one or more high refractive index layers, the first coating having a thickness of from 1 to 100 nm, and
    ii. a second coating, composed of one or more low refractive index layers, the second coating having a thickness of from 1 to 220 nm, and
b. a third coating, composed of one or more high refractive index layers, the third coating having a thickness of from 40 to 150 nm, and
c. a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm.

The present invention further provides for a laminated glass comprising said coated substrate, and for a HUD system comprising said coated substrate.

Last provided is the use of said coated substrate in a HUD system comprising a p-polarized light source which projects light at an angle of incidence on the glazing of 42 to 72° in the incident plane.

DETAILED DESCRIPTION OF THE INVENTION

The present invention provides for a coated substrate comprising a transparent substrate provided with a p-polarized light reflective coating comprising, in sequence starting from the substrate surface, a. optionally
    i. a first coating, composed of one or more high refractive index layers, the first coating having a thickness of from 1 to 100 nm, and
    ii. a second coating, composed of one or more low refractive index layers, the second coating having a thickness of from 1 to 220 nm, and
b. a third coating, composed of one or more high refractive index layers, the third coating having a thickness of from 40 to 150 nm, and
c. a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm.

In the scope of the present invention, a p-polarized light reflective coating is intended to describe a coating or stack of thin layers which is capable of reflecting incident p-polarized light, at any angle of incidence.

The transparent substrate may be a glass substrate, or a plastic substrate comprising or consisting of poly(methyl meth)acrylate (PMMA), polycarbonates, polyethyleneterephthalate (PET), polyolefins, polyvinyl chloride (PVC), or mixtures thereof.

Transparency of a substrate is considered when light transmission (T) is superior to 10%, alternatively superior to 20%, alternatively superior to 30%.

Advantageously, the transparent substrate is a glass substrate.

The glass may be of any type, such as conventional float glass or flat glass, and may be of any composition having any optical properties, e.g., any value of visible transmission above 10%, ultraviolet transmission, infrared transmission, and/or total solar energy transmission.

The glass may be a soda-lime, a borosilicate, a leaded glass, or an alumino-silicate glass. The glass may be regular a clear, colored or extra-clear (i.e. lower Fe content and higher transmittance) glass substrate. Further examples of glass substrates include clear, green, bronze, or blue-green glass substrates.

The composition of the glass is not crucial for the purpose of the present invention, provided said glass sheet is appropriate for transportation or architectural applications. The glass may be clear glass, extra-clear glass or colored glass, comprising one or more component (s)/colorant(s) in an appropriate amount as a function of the effect desired. Colored glass include grey, green or blue float glass. In some circumstances, colored glass may be advantageous to provide for appropriate and desired color of the final glazing, within the limitations of applicable legislation.

A particularly suited colored glass may be green glass, as it offers superior aesthetics as observed from the outside of a vehicle. Green glass may for example be a soda-lime glass with iron oxide in the form of $Fe_2O_3$ in amounts ranging of from 0.3 to 1.0 wt %. Another type of suitable glass may for example be a soda-lime glass with iron oxide in the form of $Fe_2O_3$ in amounts ranging of from 0.002-0.06 wt % and chromium content in the form of $Cr_2O_3$ in amounts ranging of from 0.0001-0.06 wt %.

The transparent substrate may have a thickness ranging from 0.5 mm to about 15 mm, alternatively from 1 mm to about 10 mm, alternatively from 1 mm to about 8 mm, alternatively from 1 mm to about 6 mm. In transportation applications, the glass may have a thickness ranging of from 1 to 8 mm, while they may also be thinner or thicker in construction applications, like ultrathin glass from 0.5 to 1 mm, or thicker glass, from 8 to 12 mm, in addition to the thickness of from 1 to 8 mm.

The glass may be flat or totally or partially curved to correctly fit with the particular design of the glass support, as the shape requires for the application.

The glass may be annealed, tempered or heat strengthened glass.

In the scope of the present invention, the thickness of the coatings and thin layers are geometrical thicknesses expressed in nm, unless indicated otherwise.

In the scope of the present invention, a high refractive index is typically ≥1.8, alternatively ≥1.9, alternatively ≥2.0, alternatively ≥2.1, at a wavelength of 550 nm.

In the scope of the present invention, a low refractive index is typically ≤1.7, alternatively ≤1.6, at a wavelength of 550 nm.

The high refractive index materials of the first optional coating and of the third coating may independently be selected from at least one of the oxides of Zn, Sn, Ti, Nb, Zr, Ni, In, Al, Si, Ce, W, Mo, Sb and Bi and mixtures thereof, or the nitrides of Si, Al, Zr, B, Y, Ce and La and mixtures thereof. That is, the third and first coating, when present, may have the same or a different composition.

In particular, high refractive index materials capable of withstanding thermal treatments may be used, and may be selected from

- an oxide of Zr, Nb, Sn, Zn or Ti;
- a mixed oxide of two or more of Ti, Zr, Nb, Si, Sb, Sn, Zn, In;
- a nitride of Si, Zr, Al, B;
- a mixed nitride of two or more of Si, Zr, Al, B.

In some embodiments of the present invention, the high refractive index materials may be selected from mixed titanium zirconium oxide, mixed titanium silicon oxide, mixed niobium zirconium oxide, mixed silicon zirconium nitride, aluminum doped silicon nitride, zirconium oxide, mixed indium tin oxide, mixed zinc rich aluminum oxide, mixed antimony tin oxide, mixed titanium zinc oxide, mixed zinc tin oxide.

In some alternative embodiments of the present invention, the high refractive index materials may be selected from mixed titanium zirconium oxide, mixed titanium silicon oxide, mixed niobium zirconium oxide, mixed silicon zirconium nitride, aluminum doped silicon nitride, zirconium oxide, mixed zinc tin oxide.

Preferred high refractive index materials to provide for maximum polarized light reflection include, in decreasing order of preference for durability reasons, mixed titanium zirconium oxide, mixed silicon zirconium nitride, mixed titanium silicon oxide, aluminum doped silicon nitride and mixed zinc tin oxide.

Preferred material for the high refractive index coatings is mixed titanium zirconium oxide, in a ratio Ti/Zr of from 55/45 to 75/25 wt % such that the refractive index is ≥2.0, preferably in a ratio of 65/35 wt %, or mixed titanium silicon oxide in the a ratio Ti/Si of from 85/15 to 95/5 wt %, preferably in a ratio of 92/8 wt %. Such a mixed titanium zirconium oxide coating provides good chemical and mechanical durability, stability upon heat treatment, and very low absorption.

The low refractive index materials of the second optional coating and of the fourth coating may independently be selected from silicon oxide, silicon oxynitride, silicon oxycarbide, aluminum oxide, mixed silicon aluminum oxide, mixed silicon zirconium oxide, aluminum doped zinc oxide, or mixtures thereof. The fourth and second coating, when present, may have the same or a different composition. The low refractive index materials may contain dopants, such as aluminum, boron or zinc. Generally the dopant concentration in the coating is not more than 10 wt %.

Preferred mixed oxides of silicon and zirconium comprise less than 15 wt % ZrO, such that the refractive index is ≤1.7. When improved chemical resistance is expected, such a layer of mixed oxides of silicon and zirconium comprising less than 15 wt % ZrO, may be present in the fourth coating, and have a thickness of at least 5 nm, alternatively at least 10 nm.

Preferred aluminum doped zinc oxides (AZOx) comprise less than 10 wt % Al and are substoechiometric, such that the refractive index is ≤1.7.

Preferred material for the low index layer is silicon oxide, optionally doped with aluminum or boron, or a mixed oxide of silicon and aluminum or a mixed oxide of silicon and zirconium.

The refractive index at a wavelength of 550 nm of the high refractive index materials is higher than the refractive index of the low refractive index materials. The refractive indices of the high and low refractive index materials may differ by a value of at least 0.1, preferably by a value of at least 0.2, more preferably by a value of at least 0.25. Such a refractive index difference allows for an optimal material interface and so optimal reflection of p-polarized light.

The p-polarized light reflecting coating optionally comprises a first coating, composed of one or more layers of high refractive index materials and a second coating, composed of one or more layers of low refractive index material. This optional pair of coatings provide improved reflection of p-polarized light, but at a higher production cost.

In the scope of the present invention, the first and second coatings are both optionally present in the p-polarized light reflective coating. That is, when an optical impact is to be provided, then both the first and second coatings are present at the same time.

The optional first coating is composed of one or more layers of high refractive index material, independently selected from the materials described above. When present, the first coating may have a thickness of from 1 to 100 nm, alternatively of from 2 to 80 nm, alternatively of from 4 to 65 nm, alternatively of from 4 to 15 nm.

The optional second coating is composed of one or more layers of low refractive index material, independently selected from the materials described above. When present, the second coating may have a thickness of from 1 to 220 nm, alternatively of from 2 to 210 nm, alternatively of from 4 to 200 nm, alternatively of from 100 to 200 nm.

The third coating is composed of one or more layers of high refractive index material, independently selected from the materials described above. The third coating may have a thickness of from 40 to 150 nm, alternatively of from 45 to 135 nm, alternatively of from 50 to 125 nm.

The fourth coating is composed of one or more layers of low refractive index material, independently selected from the materials described above. The fourth coating may have a thickness of from 400 to 200 nm, alternatively of from 45 to 160 nm, alternatively of from 50 to 150 nm. In the scope of the present invention, the fourth coating is the uppermost and last coating of the present p-polarized light reflective coating.

Each of the first, second, third or fourth coating may thus independently consist of one single layer, or may comprise two or more layers. The first, second, third or fourth coating may also be referred to as dielectric layers, as selected from the lists of materials described above.

In some occurrences, an undercoat may be present in contact with the transparent substrate surface. Such an undercoat is distinct from any of the first or second or third or fourth coating. Such an undercoat does not provide any optical impact to the p-polarized light reflective coating, but may function as a diffusion barrier from the substrate or as a seed layer to the subsequent layers. In preferred embodiments, the undercoat may present particularly in absence of the first and second coatings.

In some embodiments, when the first and second coatings are absent, the coated substrate comprises a transparent substrate provided with a p-polarized light reflective coating comprising, in sequence starting from the substrate surface, a. a third coating, composed of one or more high refractive index layers, the third coating having a thickness of from 40 to 150 nm, and
b. a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm.

By "absorbent material" is meant a material which absorbs a part of the visible radiation.

The absorbent material may be characterized by an average refractive index n above 1 and an average extinction coefficient k above 0.1, with the averages n and k calculated over the values of n and k at 3 wavelengths, namely 450 nm, 550 nm and 650 nm.

The average n is thus calculated using the values of refractive index of the material at the 3 wavelengths of 450 nm, 550 nm and 650 nm. The average k is calculated using the values of extinction coefficient of the material at the 3 wavelengths of 450 nm, 550 nm and 650 nm.

The skilled person in the art is familiar with the n and k optical parameters. Thin film optical simulation software such as Thin Film Center or CODE, have their own databases but also provide a reliable tool for person skilled in the art to fit n and k optical models of thin films deposited with known physical thickness and a characterized substrate.

The at least one first layer of absorbent material may be selected from NiCr, W, Nb, Zr, Ta, Pd, Si, Ti, or alloys based on Ni and/or Cr and/or W or alloys based on Cr and Zr, or on W and Zr or Cr, or on W and Ta, optionally including an additional element selected from Ti, Nb, Ta, Ni and Sn; or from TiN, CrN, WN, NbN, TaN, ZrN, NiCrN, or NiCrWN, or a mixture of these nitrides.

The nitrides may also be partially oxidized provided absorption is maintained with k above 0.1 over the range between 450 nm and 650 nm.

The absorbent material layer may be provided with at least one barrier layer above and/or below said absorbent layer. Such a barrier layer may have a geometric thickness comprised between 5 and 50 nm. Examples of such barrier layers include silicon nitride or aluminum doped zinc oxide or titanium oxide or mixed titanium zirconium oxide.

That is, in some instances, the at least one first layer of absorbent material may comprise a layer of NiCr or NiCrW provided with at least one barrier of silicon nitride, or be flanked by a first dielectric coating formed essentially of silicon nitride and a second dielectric coating formed essentially of silicon nitride, each independently having a geometric thickness comprised between 5 and 50 nm; or the at least one first layer of absorbent material may comprise a layer of Pd flanked by a first dielectric coating formed essentially of aluminum doped zinc oxide and a second dielectric coating formed essentially of aluminum doped zinc oxide, each independently having a geometric thickness comprised between 5 and 50 nm. Such a layer of absorbent material allows for optimal reflection of p-polarized light with optimal light absorption.

The at least one first layer of absorbent material may preferably be selected from NiCr, W, Nb, Pd, Si, Ti, or alloys based on Ni and/or Cr and/or W; or from TiN, CrN, WN, NbN, TaN, ZrN, NiCrN, or NiCrWN, or a mixture of these nitrides.

The at least one first layer of absorbent material may more preferably be selected from NiCr, W, Pd, Si, Ti, or alloys based on Ni and/or Cr and/or W; or from TiN, CrN, WN, NiCrN, or NiCrWN, or a mixture of these nitrides.

Although not mandatory, heat resistance of the absorbent material may be useful, that is, it preferably remains essentially unchanged upon a heat treatment above a temperature of 400° C.

In some instances, the at least one first layer of absorbent material may comprise one or more single layers, in contact with one another. In some instances, the at least one first layer of absorbent material may have a graded composition throughout its thickness, as provided by the deposition conditions.

In the scope of the present invention, the absorbent material does not comprise silver. A material such as silver does not provide the necessary enhancement of the reflection of the p-polarized light due to its low refractive index n below 1. Also, in the scope of the present invention, the p-polarized light reflective coating ultimately being present on a surface of the substrate facing the interior of an habitacle (room or vehicle), it requires mechanical and chemical durability, which a material such as silver cannot offer, since silver would be degraded and/or oxidized by the ambient air, rendering the p-polarized light reflective coating ineffective.

The at least one first layer of absorbent material may have a thickness of from 0.2 to 15 nm, alternatively of from 0.5 to 15 nm, alternatively of from 2 to 12 nm.

The at least one first layer of absorbent material may be 1) either inserted between at least two adjacent coatings of the said first (when present), second (when present), third or fourth coating, or
2) inserted within at least one of the said first (when present), second (when present), third or fourth coating.

When the at least one first layer of absorbent material is inserted between at least two adjacent coatings of the said first, second, third or fourth coating, it means that the at least one first layer of absorbent material may be inserted between the optional first and second coatings, when present; or inserted between the second, when present, and third coatings; or inserted between the third and fourth coatings.

If the said first and second coatings are absent, then the at least one first layer of absorbent material may be either inserted between the adjacent third or fourth coatings, or within at least one of the third or fourth coating.

If the said first and second coatings are present, then the at least one first layer of absorbent material may be 1) either inserted between at least two adjacent coatings of the said first, second, third or fourth coating, or
2) inserted within at least one of the said first, second, third or fourth coating.

The at least one layer of absorbent material is not in any event positioned above or over the fourth coating, said fourth coating being the last layer of the stack of thin layers A schematic manner to express such possibilities may be outlined as follows:

substrate/H3/ABS/L4 or
substrate/H1/ABS/L2/H3/L4 or
substrate/H1/L2/ABS/H3/L4 or
substrate/H1/L2/H3/ABS/L4, wherein H1 and H3 represent the first and third coatings (high refractive index coatings), L2 and L4 represent the second and fourth coatings (low refractive index coatings), and ABS is the at least one first layer of absorbent material.

When the at least one first layer of absorbent material is inserted within at least one of the said first, second, third or fourth coating, it means that the at least one first layer of absorbent material may be inserted within the optional first coating, when present; or within the optional second coating, when present; or within the third coating; or within the fourth coating. Indeed, the presence of multiple layers allows for the insertion of the at least one absorbent material within either one of said coatings.

A schematic manner to express such possibilities may be outlined as follows:

substrate/H3a/ABS/H3b/L4 or
substrate/H3/L4a/ABS/L4b or
substrate/H1a/ABS/H1b/L2/H3/L4 or
substrate/H1/L2a/ABS/L2b/H3/L4 or
substrate/H1/L2/H3a/ABS/H3b/L4 or
substrate/H1/L2/H3/L4a/ABS/L4b wherein H1 and H3 represent the first and third coatings (high refractive index coatings), L2 and L4 represent the second and fourth coatings (low refractive index coatings) each with the letters "a" and "b" when the said coating is split by the insertion of the at least one absorbent layer, and ABS is the at least one first layer of absorbent material.

An advantage of the present coated substrate comprising a transparent substrate provided with a p-polarized light reflective coating is that, when an incident p-polarized light is reflected from the coated side of the glass, the polarization enhancement factor (PEF) Rp−pol/Rv(in) (%) (p-polarized light reflection/interior reflection in the visible range) is increased by at least 6% when only the third and fourth coatings are present, alternatively by at least 8%, alternatively by at least 10%, as compared to the same p-polarized reflective coating without the at least one layer of absorbent material, at an incident angle of the p-polarized light of from 42 to 72°, alternatively at an angle of 65°. When the first, second, third and fourth coatings are present, the polarization enhancement factor (PEF) Rp−pol/Rv(in) is increased by at least 3%, as compared to the same p-polarized reflective coating without the at least one layer of absorbent material, at an incident angle of the p-polarized light of from 42 to 72°, alternatively at an angle of 65°. That is, the Rp−pol is increased, while the Rv(in) is either maintained at the same level (with a variation of at most 5%) or even decreased. Without wishing to be bound by theory, the selected absorbent material layer is believed to improve p-polarized reflection from the coated surface, while, by absorption, reducing the total reflection.

The present p-polarized light reflective coating shows an increase in absorption compared to the same p-polarized reflective coating without its absorbent material layer. The increase in absorption imparted by the presence of the absorbent material layer in the p-polarized reflective coating of the present invention may be of at least 1.5% on clear glass, with Illuminant A, CIE 2°. In some instances, the increase may be of at least 2%. In some instances, the increase may be of at least 5%. In instances where a layer of silver would be considered as absorbent material, contrary to the present invention, there is no such increase in absorption observed, that is, such increase is $<1.5\%$.

The present p-polarized light reflective coating is considered a nonconductive coating, that is, its sheet resistance may be $>100$ Ohm/square. This provides for the advantage that the present coated substrate comprising a transparent substrate provided with a p-polarized light reflective coating does not require decoating to be compatible for use in advanced driver-assistance systems (ADAS) or compatible with electromagnetic communication thorough the glass. This would not be possible if a silver layer would be considered as absorbent material.

The present p-polarized light reflective coating is not considered a low emissivity coating. Low emissivity coatings may typically be characterized by an emissivity of 0.4 or less, or 0.2 or less. On the other hand, the present p-polarized light reflective coating may be characterized by an emissivity superior to 0.5, or superior to 0.6, or even superior to 0.7.

In some instances, a second layer of absorbent material, distinct from the first layer of absorbent material, may be present, provided it is in a different position from the first absorbent material layer. Said second absorbent material layer may thus be 1) either inserted between two adjacent layers of dielectric of at least one of the said first (when present), second (when present), third or fourth coatings; or,
2) inserted within at least one of the said first (when present), second (when present), third or fourth coating, with the location of the second layer of absorbent material being different from the location of the first layer of absorbent material.

If the said first and second coatings are absent, then the second layer of absorbent material may be either inserted between the adjacent third or fourth coatings, or within at least one of the third or fourth coating.

If the said first and second coatings are present, then the second layer of absorbent material may be 1) either inserted between at least two adjacent coatings of the said first, second, third or fourth coating, or
2) inserted within at least one of the said first, second, third or fourth coating.

When present, the second layer of absorbent material is not in contact with the first layer of absorbent material.

The first and second layers of absorbent material may comprise the same material, as discussed above, or may comprise different materials.

A method to provide for the coated substrate comprises the steps of providing for a transparent substrate;

and depositing

- a. optionally
  - i. a first coating, composed of one or more high refractive index layers, the first coating having a thickness of from 1 to 100 nm, and
  - ii. a second coating, composed of one or more low refractive index layers, the second coating having a thickness of from 1 to 220 nm, and
- b. a third coating, composed of one or more high refractive index layers, the third coating having a thickness of from 40 to 150 nm, and
- c. a fourth coating, composed of one or more low refractive index layers, the fourth coating having a thickness of from 40 to 200 nm, and further depositing at least one first layer of absorbent material such that said first layer of polarization enhancement material is either inserted between at least two adjacent coatings of the said first, second, third or fourth coating, or inserted within at least one of the said first, second, third or fourth coating.

The deposition methods of the different coatings include chemical vapor deposition (CVD), Plasma enhanced chemical vapor deposition (PECVD), Physical vapor deposition (PVD), magnetron sputtering, wet coating, etc. Different layers of the respective coatings may be deposited using different techniques.

In some embodiments, the low refractive index layers of the fourth and optional second coatings may be deposited by a PECVD method, such as hollow cathode PECVD method. This method provides for the added benefit of reduced cost and high deposition rate.

The deposition step of the at least one first layer of absorbent material should be carried out such that it is not fully oxidized, such that it can perform as effective polarization enhancement layer. Therefore, gas atmosphere during deposition is preferably argon, nitrogen or a mixture of argon and nitrogen. Oxidation may occur during the deposition of a subsequent layer, however, a minimal thickness of at least 0.2 nm of non-oxidized absorbent material is required to perform in the scope of the present invention.

The deposition step may be followed by a thermal treatment step. The thermal treatments comprise heating the glazing to a temperature of at least 560° C. in air, for example between 560° ° C. and 700° ° C., in particular around 640° ° C. to 670° C., during around 3, 4, 6, 8, 10, 12 or even 15 minutes according to the heat-treatment type and the thickness of the glazing. The treatment may comprise a rapid cooling step after the heating step, to introduce a stress difference between the surfaces and the core of the glass so that in case of impact, the so-called tempered glass sheet will break safely in small pieces. If the cooling step is less strong, the glass will then simply be heat-strengthened and in any case offer a better mechanical resistance.

The present invention also provides for a laminated glazing comprising an outer pane having a first surface and a second surface, and an inner pane having a first surface and a second surface, both sheets bonded by at least one sheet of interlayer material providing contact between the first surface of the inner pane and the second surface of the outer pane, wherein the inner sheet is a coated substrate comprising a transparent substrate provided with a p-polarized light reflective coating, on its second surface, comprising, in sequence starting from the substrate surface, 1) optionally
   - i. a first coating, composed of one or more high refractive index layers, the first coating having a thickness of from 1 to 100 nm, and
   - ii. a second coating, composed of one or more low refractive index layers, the second coating having a thickness of from 1 to 220 nm, and
2) a third coating, composed of one or more high refractive index layers, the third coating having a thickness of from 40 to 150 nm, and
3) a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm.

That is, the present invention also relates to a laminated glazing comprising at least two panes, bonded together by at least one sheet of interlayer material wherein at least one of the panes is the coated substrate described above. The panes may be selected from the transparent substrates described above.

The laminated glazing comprises an outer pane having a first surface (P1) and a second surface (P2), and an inner pane having a first surface (P3) and a second surface (P4). The outer pane of the laminated glazing is that pane in contact with the exterior of the vehicle or building. The inner pane is that pane in contact with the inner space of the vehicle or building. The two panes are held in contact with a laminating sheet or interlayer, serving the adhesion and contact between the two sheets of glass. The interlayer provides for the contact between the first surface of the inner pane (P3) and the second surface of the outer pane (P2).

In the present laminated glazing, the coated substrate is the inner pane, and said sheet is present in the laminated glazing such that the p-polarized light reflective coating is present on the second surface of the inner pane, that is, in P4. The second surface of the inner pane is thus provided with the p-polarized light reflective coating and is thus the exposed surface of the laminated glazing facing the inner space of the vehicle or building.

The interlayer typically contains thermoplastic materials, for example, polyvinyl butyral (PVB), ethylene vinyl acetate (EVA), polyurethane (PU), polyethylene terephthalate (PET), polycarbonate, or multiple layers thereof, typically with a total thickness of from 0.3 to 0.9 mm. The interlayer may contain colorants, and thus be a colored interlayer.

In some instances, when the transparent substrate is not colored, the interlayer may be a colored interlayer. Such colored interlayer may provide for superior aesthetics from an outside observer's viewpoint.

The interlayer may have a uniform thickness throughout its surface between the two panes, or may have a non-uniform thickness throughout its surface, that is, the interlayer may be a "wedge" interlayer.

The interlayer may comprise light absorber or any other light interfering polymers, if the end use so requires, provided the initial purpose of the present invention is not jeopardized.

In the scope of the present invention, an infrared reflective (IR) coating comprising n infrared reflective (IR) functional layer based layer and n+1 dielectric layers, each IR reflective functional layer based layer being located between two dielectric layers, may optionally be provided between the outer pane and the inner pane of the laminated glazing. That is, an infrared reflective (IR) coating may be applied on at least one of the first surface of the inner pane (P3) or the second surface of the outer pane (P2) or embedded in the interlayer.

The present laminated glazing may thus further comprise, on at least one of the first surface of the inner pane or the second surface of the outer pane or embedded in the interlayer, an infrared reflective coating comprising n IR reflective functional layer based layer and n+1 dielectric layers, each IR reflective functional layer based layer being located between two dielectric layers. Such infrared reflective coatings may typically be characterized by an emissivity of 0.1 or less, or preferably 0.08 or less, or more preferably 0.05 or less.

The IR coating is compatible with all previous embodiments described above. Such a IR coating does not impair the functioning of the p-polarized light reflective coating, that is, the p-polarized light reflective coating is still providing for p-polarized light reflection useful to reflect a clear and sharp image display on a glazing in a HUD system.

In the scope of the present invention, the terms "below", "underneath", "under" indicate the relative position of a layer vis a vis a next layer, within the layer sequence starting from the substrate. In the scope of the present invention, the terms "above", "upper", "on top", "on" indicate the relative position of a layer vis a vis a next layer, within the layer sequence starting from the substrate.

In the scope of the present invention, the relative positions of the layers within the IR coating do not necessarily imply direct contact. That is, some intermediate layer may be provided between a first and a second layer. In some instances, a layer may actually be composed of several multiple individual layers (or sublayers).

In some instances, the relative position may imply direct contact, and will be specified.

The IR reflective metallic functional layer (or functional layer) may be made of silver, or aluminum or alloys thereof, eventually doped with less than 15 wt % with platinum, palladium or gold. The functional layer may have a thickness of from 5 to 22 nm, alternatively of from 7 to 20 nm, alternatively of from 8 to 18 nm. The thickness range of the functional layer will influence the conductivity, the emissivity, the anti-solar function and the light transmission of the second coating.

The dielectric layers may typically comprise oxides, nitrides, oxynitrides or oxycarbides of Zn, Sn, Ti, Zr, In, Al, Bi, Ta, Mg, Nb, Y, Ga, Sb, Mg, Si and mixtures thereof. These materials may be optionally doped, where examples of dopants include aluminum, zirconium, or mixtures thereof. The dopant or mixture of dopants may be present in an amount up to 15 wt %. Typical examples of dielectric materials include, but are not limited to, silicon based oxides, silicon based nitrides, zinc oxides, tin oxides, mixed zinc-tin oxides, silicon nitrides, silicon oxynitrides, titanium oxides, aluminum oxides, zirconium oxides, niobium oxides, aluminum nitrides, bismuth oxides, mixed silicon-zirconium nitrides, and mixtures of at least two thereof, such as for example titanium-zirconium oxide.

The IR coating may comprise a seed layer underneath at least one functional layer, and/or the coating may comprise a barrier layer on at least one functional layer. A given functional layer may be provided with either a seed layer, or a barrier layer or both. A first functional layer may be provided with either one or both of seed and barrier layers, and a second functional layer may be provided with either one or both of seed and barrier layers and further so. These constructions are not mutually exclusive. The seed and/or barrier layers may have a thickness of from 0.1 to 35 nm, alternatively 0.5 to 25 nm, alternatively 0.5 to 15 nm, alternatively 0.5 to 10 nm.

The IR coating may also comprise a thin layer of sacrificial material having a thickness $<15$ nm, alternatively $<9$ nm, provided above and in contact with at least one functional layer, and which may be selected from the group comprising titanium, zinc, nickel, aluminum chrome and mixtures thereof.

The IR coating may optionally comprise a topcoat or top layer, as last layer, intended to protect the stack below it, from damage. Such top coat include oxides of Ti, Zr, Si, Al, or mixtures thereof; nitrides of Si, Al, or mixtures thereof; carbon-based layers (such as graphite or diamond-like carbon).

Examples of IR coatings include those coatings comprising:

an infrared (IR) reflecting layer contacting and sandwiched between first and second layers, said second layer comprising NiCrOx; and wherein at least said second layer comprising NiCrOx is oxidation graded so that a first portion of said second layer close to said infrared (IR) reflecting layer is less oxidized than a second portion of said second layer that is further from said infrared (IR) reflecting layer.

Examples of IR coatings also include those coatings comprising: a dielectric layer; a first layer comprising zinc oxide located over the dielectric layer; an infrared (IR) reflecting layer comprising silver located over and contacting the first layer comprising zinc oxide; a layer comprising an oxide of NiCr located over and contacting the IR reflecting layer; a second layer comprising zinc oxide located over and contacting the layer comprising the oxide of NiCr; and another dielectric layer located over the second layer comprising zinc oxide; or those comprising: a first dielectric layer; a first infrared (IR) reflecting layer comprising silver located over at least the first dielectric layer; a first layer comprising zinc oxide located over at least the first IR reflecting layer and the first dielectric layer; a second IR reflecting layer comprising silver located over and contacting the first layer comprising zinc oxide; a layer comprising an oxide of NiCr located over and contacting the second IR reflecting layer; a second layer comprising zinc oxide located over and contacting the layer comprising the oxide of NiCr; and another dielectric layer located over at least the second layer; comprising zinc oxide.

Further suitable examples of IR coatings include a solar control coating comprising a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti, a first metallic infra-red reflecting layer, such as silver, or aluminum or mixtures thereof eventually doped with less than 15 wt % with platinum, palladium or gold, a first barrier layer, a central dielectric layer comprising at least a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which the ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti, a second metallic infra-red reflecting layer, such as silver, or aluminum or mixtures thereof eventually doped with less than 15 wt % with platinum, palladium or gold, a second barrier layer, a top dielectric layer.

A still further example of suitable IR coatings includes a solar control coating comprising a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti, a first metallic infra-red reflecting layer, such as silver, or aluminum or mixtures thereof eventually doped with less than 15 wt % with platinum, palladium or gold, a first barrier layer, a second dielectric layer comprising at least a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which the ratio Y/Zn in the second dielectric upper layer is between 0.02 and 0.5 by weight and in which Y is one or more of the materials selected from the group comprising Sn, Al, Ga, In, Zr, Sb, Bi, Mg, Nb, Ta and Ti, a second metallic infra-red reflecting layer, such as silver, or aluminum or mixtures thereof eventually doped with less than 15 wt % with platinum, palladium or gold, a second barrier layer, a third dielectric layer comprising at least a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which the ratio Y/Zn in the third dielectric upper layer is between 0.02 and 0.5 by weight and in which Y is one or more of the materials selected from the group comprising Sn, Al, Ga, In, Zr, Sb, Bi, Mg, Nb, Ta and Ti, a third metallic infra-red reflecting layer, such as silver, or aluminum or mixtures thereof eventually doped with less than 15 wt % with platinum, palladium or gold, a third barrier layer, a top dielectric layer.

In such stacks, the base dielectric upper layer may be in direct contact with the first infra-red reflecting layer. The central dielectric upper layer may be in direct contact with the second infra-red reflecting layer. The upper layers of both the base dielectric layer and the central, first and second dielectric layer may independently have a geometrical thickness within the range of about 3 to 20 nm. One or both of the additional materials X and Y may be Sn and/or Al. The proportion of Zn in the mixed oxide that forms the base dielectric upper layer and/or that which forms the central dielectric upper layer may be such that ratio X/Zn and/or the ratio Y/Zn is between about 0.03 and 0.3 by weight. The first and/or second and/or third barrier layer may be a layer comprising Ti and/or comprising an oxide of Ti, and they may each independently have a geometrical thickness of from 0.5 to 7 nm. The base dielectric upper layer and/or the central and/or the second and/or third dielectric upper layer may independently have a geometrical thickness $<20$ nm, alternatively $<15$ nm, alternatively $<13$ nm, alternatively $<11$ nm, and $>3$ nm, alternatively $>5$ nm, alternatively $>10$ nm. The infra-red reflecting layers may each independently have a thickness of from 2 to 22 nm, alternatively of from 5 to 20 nm, alternatively of from 8 to 18 nm. The top dielectric layer may comprise at least one layer which comprises a mixed oxide of Zn and at least one additional material Ma, in which the ratio Ma/Zn in that layer is between 0.02 and 2.0 by weight and in which Ma is one or more of the materials selected from the group comprising Sn, Al, Ga, In, Zr, Sb, Bi, Mg, Nb, Ta and Ti.

A specific example of such a solar control coating is provided in Table 0 below, in which ZnSnOx is a mixed oxide containing Zn and Sn deposited by reactively sputtering a target which is an alloy or mixture of Zn and Sn, in the presence of oxygen. Alternatively, a mixed oxide layer may be formed by sputtering a target which is a mixture of zinc oxide and an oxide of an additional material, particularly in an argon gas or argon rich oxygen containing atmosphere.

The Ti barriers are deposited by sputtering a Ti target which is in a pure argon or in an argon rich oxygen containing atmosphere to deposit a barrier that is not fully oxidized. The oxidation state in each of the base, central and top ZnSnOx dielectric layers need not necessarily be the same. Similarly, the oxidation state in each of the Ti barriers need not be the same. Each overlying barrier protects its underlying silver layer from oxidation during sputter deposition of its overlying ZnSnOx oxide layer. Whilst further oxidation of these barriers layers may occur during deposition of their overlying oxide layers a portion of these barriers may remain in metallic form or in the form of an oxide that is not fully oxidized to provide a barrier for and during subsequent heat treatment of the glazing panel.

TABLE A

| (ratio of Sn/Zn by weight) | Geometrical thickness |
|---|---|
| Glass substrate | 1.1-3 mm |
| Base dielectric layer comprising: | |
| lower layer of ZnSnOx (0.7) | 15-30 nm |
| upper layer of ZnSnOx (0.17) | 7-12 nm |
| Ag | 8-12 nm |
| Ti overlying barrier | 4-9 nm |
| Central dielectric layer comprising | |
| central lower layer of ZnSnOx (0.7) | 60-70 nm |
| upper layer of ZnSnOx (0.17) | 7-12 nm |
| Ag | 8-12 nm |
| Ti overlying barrier | 4-9 nm |
| Top dielectric layer comprising: | |
| lower layer of ZnSnOx (0.17) | 6-9 nm |
| upper layer of ZnSnOx (0.7) | 11-18 nm |
| Protective overcoat of Ti | 2-8 nm |

An optimal IR coating suitable to the present invention may comprise the following sequential layers:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, the base dielectric upper layer comprising a mixed oxide of Zn and Sn having a ratio Sn/Zn ranging from 0.02 to 0.5 by weight a first infra-red reflecting layer comprising metallic silver a first barrier layer a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2 the central dielectric upper layer comprising a mixed oxide of Zn and Sn having a ratio Sn/Zn ranging from 0.02 to 0.5 by weight a second infra-red reflecting layer comprising metallic silver a second barrier layer a top dielectric layer.

Such optimal IR coating suitable to the present invention may comprise the following sequential layers and geometrical thicknesses:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, having a geometrical thickness of from 15-25 nm, the base dielectric upper layer comprising a mixed oxide of Zn and Sn having a ratio Sn/Zn ranging from 0.02 to 0.5 by weight, having a geometrical thickness of from 5-15 nm, a first infra-red reflecting layer comprising metallic silver, having a geometrical thickness of from 8-16 nm, a first barrier layer, having a geometrical thickness of from 3-8 nm, a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2, having a geometrical thickness of from 58-74 nm, the central dielectric upper layer comprising a mixed oxide of Zn and Sn having a ratio Sn/Zn ranging from 0.02 to 0.5 by weight, having a geometrical thickness of from 5-15 nm, a second infra-red reflecting layer comprising metallic silver, having a geometrical thickness of from 8-16 nm, a second barrier layer, having a geometrical thickness of from 3-8 nm, a top dielectric layer, having a geometrical thickness of from 14-22 nm, an optional topcoat having a geometrical thickness of from 2-8 nm.

A further optimal IR coating suitable to the present invention may comprise the following sequential layers:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight the base dielectric upper layer comprising a mixed oxide of Zn and Sn having a ratio Sn/Zn ranging from 0.02 to 0.5 by weight a first infra-red reflecting layer comprising metallic silver a first barrier layer a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2 the second dielectric upper layer comprising a mixed oxide of Zn and Sn having a ratio Sn/Zn ranging from 0.02 to 0.5 by weight a second infra-red reflecting layer comprising metallic silver a second barrier layer a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2 the third dielectric upper layer comprising a mixed oxide of Zn and Sn having a ratio Sn/Zn ranging from 0.02 to 0.5 by weight a third infra-red reflecting layer comprising metallic silver a third barrier layer a top dielectric layer.

Such further optimal IR coating suitable to the present invention may comprise the following sequential layers and geometrical thicknesses:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, having a geometrical thickness of from 25-35 nm, the base dielectric upper layer comprising a mixed oxide of Zn and Sn having a ratio Sn/Zn ranging from 0.02 to 0.5 by weight, having a geometrical thickness of from 5-15 nm, a first infra-red reflecting layer comprising metallic silver, having a geometrical thickness of from 10-16 nm, a first barrier layer, having a geometrical thickness of from 3-8 nm, a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2, having a geometrical thickness of from 58-74 nm, the second dielectric upper layer comprising a mixed oxide of Zn and Sn having a ratio Sn/Zn ranging from 0.02 to 0.5 by weight, having a geometrical thickness of from 5-15 nm, a second infra-red reflecting layer comprising metallic silver, having a geometrical thickness of from 10-17 nm, a second barrier layer, having a geometrical thickness of from 3-8 nm, a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2, having a geometrical thickness of from 50-75 nm, the third dielectric upper layer comprising a mixed oxide of Zn and Sn having a ratio Sn/Zn ranging from 0.02 to 0.5 by weight, having a geometrical thickness of from 5-15 nm, a third infra-red reflecting layer comprising metallic silver, having a geometrical thickness of from 10-16 nm, a third barrier layer, having a geometrical thickness of from 3-8 nm, a top dielectric layer, having a geometrical thickness of from 20-40 nm, an optional topcoat having a geometrical thickness of from 2-8 nm.

The deposition methods of the optional IR coating on the surface of the pane include chemical vapor deposition (CVD), Plasma enhanced chemical vapor deposition (PECVD), Physical vapor deposition (PVD), magnetron sputtering, wet coating, etc. Different layers of the respective coatings may be deposited using different techniques.

The pane bearing the IR coating may be thermally treated according to the thermal treatments described above.

When embedded in the interlayer, the IR coating may be deposited on a plastic substrate, said plastic substrate then being inserted between the first surface of the inner pane and the second surface of the outer pane, within the interlayer (sandwiched by interlayer material on both sides), or in contact with one of first surface of the inner pane and the second surface of the outer pane on one side and in contact with the interlayer on the other side.

Examples of plastic substrates include poly(ethyleneterephthalate) ("PET"), poly(butyleneterephthalate), polyacrylates and methacrylates such as poly(methylmethacrylate) ("PMMA"), poly(methacrylate), and poly(ethylacrylate), copolymers such as poly(methylmethacrylate-co-ethylacrylate) and polycarbonates, in the form of thin sheets. The plastic substrates themselves are commercially available or can be prepared by various art-known processes.

IR coatings on plastic substrates comprising are typically known in the art and will not be described herein. Some may be commercially available from at least Eastman, or 3M.

In the scope of the present invention, the inner pane provided with the p-polarized light reflective coating may be subjected to a thermal treatment, given said coating is able to withstand such thermal treatment. In some instances, the inner pane provided with the first coating is subjected to a thermal treatment.

In some case, it may be useful to mechanically reinforce the outer pane by a thermal treatment to improve its resistance to mechanical constraints. It may also be necessary to bend the laminated glazing at high temperature for specific applications.

The laminated glazing may be assembled by a lamination step for flat substrates, or may be a bending step for curved substrates, which bending step includes the steps of first bending the panes and second, laminating said bent panes.

The present invention also provides for a HUD system comprising 1) a light source projecting p-polarized light towards a laminated glazing,
2) said laminated glazing comprising an outer pane having a first surface and a second surface, and an inner pane having a first surface and a second surface, both panes bonded by at least one sheet of interlayer material providing contact between the first surface of the inner pane and the second surface of the outer pane, wherein the inner pane is a coated substrate comprising a transparent substrate provided with a p-polarized light reflective coating, on its second surface, comprising, in sequence starting from the substrate surface,
   a. optionally
      i. a first coating, composed of one or more high refractive index layers, the first coating having a thickness of from 1 to 100 nm, and
      ii. a second coating, composed of one or more low refractive index layers, the second coating having a thickness of from 1 to 220 nm, and
   b. a third coating, composed of one or more high refractive index layers, the third coating having a thickness of from 40 to 150 nm, and
   c. a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm.

That is, the present HUD system comprises 1) a light source projecting p-polarized light towards a laminated glazing, and
2) a laminated glazing as described above, said laminated glazing comprising the coated substrate also described above.

That is, expressed in an equivalent manner, the present HUD system comprises 1) a light source projecting p-polarized light towards a laminated glazing, and
2) a laminated glazing comprising at least two panes, bonded together by at least one sheet of interlayer material wherein at least one of the panes is the coated substrate described above.

The light source typically provides for light projection towards the glazing. The light source in the scope of the present invention, includes a polarizer such that the projected light is p-polarized light. In the scope of the present invention, the light source thus provides for p-polarized light. Such light allows for advantageous reflection of the projected information towards the glazing.

Light sources providing for p-polarized light are typically known in the art and will not be described herein.

Typically, the projected light is incident to the glazing at an angle of 42 to 72 degrees, in the incident plane.

An advantage of the present HUD system configured with p-polarized light source, is that the (Rp−pol) may reach up to 14%, at an angle of incidence of said p-polarized light of 65°. Values of reflected p-polarized light may rise up to 16%, up to 18% or even up to 19% at an angle of 65°.

The present coated substrate may be useful in transportation applications or architectural applications, where projection of images or light from a p-polarized light source may be used. Architectural applications include displays, windows, doors, partitions, shower panels, and the like. In such architectural applications, the projection of a sharp image may be useful for displaying room information, building information, entertainment material or the like.

Transportation applications include those vehicles for transportation on road, in air, in and on water, in particular cars, busses, trains, ships, aircraft, spacecraft, space stations and other motor vehicles.

The present coated substrate may thus be a windshield, rear window, side window, sun roof, panoramic roof or any other window useful for a car, or any glazing for any other transportation device, where the projection of a sharp image may be useful. The information projected and reflected may include any traffic information, such as directions or traffic density; or any vehicle status information, such as speed, temperature; or entertainment matter, or the like. The wide field of view allows for different angles of view and thus are adaptable for taller and smaller viewers/drivers.

In some instances, when a IR coating is provided in the present laminated glazing, said laminated glazing may serve as a heatable glazing. Such heatable glazing includes heatable vehicle glazing or heatable windshield.

In some embodiments, compatible with other embodiments of the invention, a second light source may be present in the HUD system and provide for a secondary image or information. The second light source may not be polarized or may be p-polarized or s-polarized, but would provide for an image the same or different from the first light source. In some instances, the image or information is different between the first and second light source. In some instances, augmented reality information may be projected by at least one of the light source, thanks to the wide field of view and/or field of projection.

In the scope of the present invention, the presence of the p-polarized light reflective coating on a vehicle glazing allows for optimal light refection of the p-polarized light while not increasing total reflectance of the dashboard to an uncomfortable level for the driver.

The final utilization conditions involve that the coating is on the external surface of the glazing exposed to the interior of the vehicle or building, which implies exposure to various kind of cleaning agents, humidity, pollution and mechanical wear.

The present invention also provides for the use of a coated substrate comprising a transparent substrate provided with a p-polarized light reflective coating comprising, in sequence starting from the substrate surface, a. optionally
   i. a first coating, composed of one or more high refractive index layers, the first coating having a thickness of from 1 to 100 nm, and
   ii. a second coating, composed of one or more low refractive index layers, the second coating having a thickness of from 1 to 220 nm, and
b. a third coating, composed of one or more high refractive index layers, the third coating having a thickness of from 40 to 150 nm, and
c. a fourth coating, composed of one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over the values at the wavelengths of 450 nm, 550 nm and 650 nm; in a HUD system comprising a p-polarized light source which projects light at an angle of incidence on the glazing of 42 to 72°, to reflect said p-polarized light.

The present coated substrate in a HUD system allows for proper functioning of said HUD system, with the p-polarized light reflective coating having a polarization enhancement factor (PEF) Rp−pol/Rv(in) of at least 3% superior as compared to a p-polarized light reflective coating without any such absorbent layer, at an incident angle of the p-polarized light of from 42 to 72°, alternatively at an angle of 65°, when the first, second, third and fourth coatings are present. This increase in polarization enhancement factor (PEF) Rp−pol/Rv(in) is of at least 6% when only the third and fourth coatings are present, alternatively by at least 8%, alternatively by at least 10%, at an incident angle of the p-polarized light of from 42 to 72°, alternatively at an angle of 65°.

EXAMPLES

Coated substrates comprising a transparent substrate provided with a p-polarized light reflective coating were prepared or simulated by an optical modelling software in single sheet glazing, and also set up in laminated form, and evaluated for their optical parameters in view of specific light conditions. The substrates were glass sheets. Types and thicknesses of said glass sheets, coatings details and test conditions will be provided hereafter. The light source is configured to emit normal light or p-polarized light. Behavior of the glazing towards the incident light is presented in the following tables.

All optical parameters are given for illuminant D65, 2° for reflection or transmission levels and illuminant D65, 10° for color indexes (a*and b*).

All refractive indices are measured at a wavelength of 550 nm, unless otherwise indicated.

In the present examples, the clear glass was clear float glass, used with a thickness of 1.8 mm excepted when stated as a single sheet of 4 mm.

The green glass was a soda-lime glass with iron oxide in the form of $Fe_2O_3$ in amounts ranging of from 0.3 to 1.0 wt % and was used with a thickness of 1.8 mm.

Dielectric Materials:

- TZO: Titanium oxide/Zirconium oxide in a ratio 55/45 wt %, having a refractive index of 2.19 (at 550 nm)
- TrZO: Titanium oxide/Zirconium oxide in a ratio 75/25 wt % (then "Tr" standing for Titanium rich), having a refractive index of 2.33 (at 550 nm)
- TiO2: Titanium oxide refractive index of 2.37 (at 550 nm)
- TSO: Titanium oxide/Silicon oxide in a ratio 92/8 wt %, having a refractive index of 2.17 (at 550 nm)
- SiO2: Silicon oxide exhibiting a refractive index of 1.46 (at 550 nm)
- SiZrO: Silicon oxide/Zirconium oxide in a ratio 65/35 wt %, having a refractive index of 1.57 (at 550 nm)
- AZOx: sub-stoechiometric Zinc oxide/Aluminum oxide in a ratio 98/2 wt %, having a refractive index of 1.56 (at 550 nm)
- SiN: nitride of Silicon & Aluminum including Silicon/Aluminum ratio of 90/10 wt % and having a refractive index of 2.03 (at 550 nm)

Absorbent (ABS) Materials:

- Pd: 99.9% pure Palladium
- NiCr: Nickel-Chromium binary alloy with a ratio 80/20 wt %
- NiCrW: Nickel-Chromium-Tungsten ternary alloy with a Ni/Cr/W ratio 40/10/50 wt %
- NiCrWN: Nitride of Nickel-Chromium-Tungsten ternary alloy with a Ni/Cr/W ratio 40/10/50 wt %
- Si: Silicon with added aluminum including a Silicon/Aluminum ratio of 90/10 wt %

Metallic Infra-Red Reflecting Layer Material:

- Ag: 99.9% pure silver

The average refractive index n and average extinction coefficient k, for various absorbent materials and for silver are presented in Table 1. This average is calculated over 3 values of wavelength, namely at 450, 550 and 650 nm. An average refractive index n<1 is indicative of a material which does not suit as absorbent material. Silver, gold, copper, aluminum having an average n<1, are thus not suitable as the absorbent material in the scope of the present invention.

TABLE 1

| Materials | Average n | Average k |
|---|---|---|
| Pd | 3.13 | 1.73 |
| NiCr | 2.50 | 3.70 |
| NiCrW | 3.34 | 3.84 |
| NiCrWN | 2.56 | 2.20 |
| Si | 3.95 | 1.16 |
| Ag | 0.09 | 3.52 |

Parameters measured concerning external reflection ($Rv_{(out)}$) were as follows:

a) Illuminant A, 2°

- Tv (%)=transmission in the visible range
- $Rv_{(out)}$ (%)=external reflection in the visible range at a «standard» incidence angle of 8°
- $Rv_{(in)}$ (%)=interior reflection in the visible range for total light at an incidence angle of 65°, also referred to as R115(in), if the incidence angle is referenced from the opposite side of the glazing (i.e. 180°-65°)—also referred to as the total reflection in the following examples
- Rp_pol (%)=interior reflection of p-polarised light in the visible range and at an incidence angle of 65°—also referred to as Rp_pol 115° if the incidence angle is referenced from the opposite side of the glazing (i.e. 180°-65°)
- $R172_{(in)}$ (%)=interior reflection in the visible range at a «standard» incidence angle of 8° (or 172° if referred to the external surface of the glazing)
- Abs172(%)=absorption=100%−Tv (%)−$R172_{(in)}$(%)
- PEF=polarization enhancement factor=Rp_pol (%)/$Rv_{(in)}$ (%).

b) Illuminant D65, 10°

- a*$R_{out}$=a*color index of external reflection at 8°
- b*$R_{out}$=b*color index of external reflection at 8°
- a*_$R_{in}$=a*R115=a*color index of interior reflection at 115°
- b*_$R_{in}$=b*R115=b*color index of interior reflection at 115°
- a*_$R_{p_pol}$=a*R115p_pol=a*color index of interior reflection at 115° for p-polarized light
- b*_$R_{p_pol}$=b*R115p_pol=b*color index of interior reflection at 115° for p-polarized light
- a*R172=a*color index of interior reflection at 172°
- b*R172=b*color index of interior reflection at 172°

Results Generally Indicate

- transmission of visible light−Tv (%)>70%
- systematic improvement in the optical properties in interior reflection, with Rp−pol at 65° up to levels of 14 or of 16% or even 18% or 19%, while internal reflection ($Rv_{(in)}$) remained at similar levels as the respective comparative examples
- non conductivity of the p-polarized light reflective coating with a sheet resistance>100 Ohm/sq All p-polarized light reflective coating had emissivity values>0.5.

These results indicate the suitability of the present vehicle glazing in a HUD system as claimed.

Examples 1 and 2, Comparative Example 1

Examples 1 and 2 and Comparative example 1 were prepared and the coatings deposited on 4 mm single sheet clear glass as indicated in Table 2.

The absorbent material Si was sputtered from a target in an argon atmosphere. A minor part of the material is oxidized upon sputtering the subsequent silicon oxide layer and subsequent thermal treatment for windshield bending (670° C. during 10 minutes in a static or dynamic furnace). In order to provide for the required p-polarization enhancement function, a layer of silicon was proven to remain in unoxidized form, serving the purpose of absorbent material as defined herein, as also evidenced by the increased value of absorption (Abs172(%)).

Values for the parameters are indicated in Table 3.

TABLE 2

| | Thickness (nm) | | | | |
|---|---|---|---|---|---|
| Glass | TZO | TrZO | SiO2 | ABS | SiO2 |
| Comparative Example 1 | 38.7 | 30.3 | | | 115.9 |
| Example 1 | 38.7 | 30.3 | | 2.5 (Si) | 121.9 |
| Example 2 | 38.7 | 30.3 | 10 | 2.5 (Si) | 121.9 |

TABLE 3

| | Comparative Example 1 | Example 1 | Example 2 |
|---|---|---|---|
| Tv (%) | 84.3 | 77.8 | 76.5 |
| Rv(out) (%) | 12.9 | 9.8 | 11.2 |
| a* Rout | −7.5 | −6.8 | −9.4 |
| b* Rout | −15.9 | −4.4 | −3.7 |
| R172(in) (%) | 13.1 | 13.8 | 14.4 |
| Rv(in) (%) | 20.2 | 20.4 | 19.4 |
| a* R172 | −7.3 | −6.1 | −8.2 |
| b* R172 | −16.6 | −15.8 | −11.0 |
| a*_Rin | 3.9 | 4.6 | 1.3 |
| b*_Rin | −9.5 | −8.5 | −9.4 |
| Rp_pol (%) | 14.9 | 17.5 | 16.3 |
| a*_Rp_pol | −4.8 | −4.3 | −3.5 |
| b*_Rp_pol | 6.8 | 4.9 | 9.0 |
| Abs172 (%) | 2.6 | 8.4 | 9.2 |
| PEF | 0.740 | 0.856 | 0.843 |
| PEF (%) | 74.0 | 85.6 | 84.3 |
| PEF Difference vs CE1 (%) | | 11.6 | 10.3 |

Values indicate that the p-polarized light reflective coatings of Examples 1 and 2 were more efficient in reflecting p-polarized light, while managing an acceptable total reflection ($Rv_{(in)}$), with a p-polarizing enhancement factor of more than 80%. This showed an increase of more than 8% as compared to a p-polarized light reflective coating without ABS layer of Comparative example 1.

Absorption also increased, from a value of about 2% for Comparative example 1 up to values above 8% for Examples 1 and 2, as effected by the ABS layer of silicon.

Examples 1 and 2 and Comparative example 1 had a sheet resistance>200 Ohm/sq.

Examples 3 and 4, Comparative Examples 2 and 3

Examples 3 and 4 and Comparative example 2 were the laminated version of the stacks of Examples 1 and 2, deposited on a sheet of clear float glass of 1.8 mm.

Laminated glazings were thus provided, comprising a sheet of green float glass of 1.8 mm, laminated with a PVB interlayer of 0.76 mm, to a sheet of clear float glass of 1.8 mm bearing the p-polarized light reflective coating, such that the coating was positioned towards the interior of a vehicle (P4). The structures of the coatings are the same as provided in Table 2 above.

Comparative example 2 was a laminated glazing, comprising a sheet of green float glass of 1.8 mm, laminated with a PVB interlayer of 0.76 mm, to a sheet of clear float glass of 1.8 mm bearing the coating of Comparative example 1.

Comparative example 3 was a laminated glazing, comprising a sheet of green float glass of 1.8 mm, laminated with a PVB interlayer of 0.76 mm, to a sheet of clear float glass of 1.8 mm bearing no coating.

Values for the parameters are indicated in Table 4.

TABLE 4

| | Comparative Example 3 | Comparative Example 2 | Example 3 | Example 4 |
|---|---|---|---|---|
| Tv (%) | 83.8 | 79.0 | 72.8 | 71.6 |
| Rv(out) (%) | 7.5 | 11.9 | 9.1 | 10.4 |
| a* Rout | −1.5 | −9.2 | −7.7 | −10.3 |
| b* Rout | 0.0 | −13.5 | −3.4 | −2.7 |
| R172(in) (%) | 7.5 | 12.7 | 13.5 | 14.0 |
| Rv(in) (%) | 19.2 | 18.6 | 19.0 | 17.9 |
| a* R172 | −1.5 | −8.1 | −6.7 | −8.8 |
| b* R172 | 0.0 | −16.8 | −16.1 | −11.2 |
| a*_Rin | −1.9 | 3.0 | 3.9 | 0.1 |
| b*_Rin | 0.4 | −10.2 | −9.4 | −10.6 |
| Rp_pol (%) | 2.5 | 14.8 | 17.3 | 16.2 |
| a*_Rp_pol | −1.2 | −5.0 | −4.5 | −3.7 |
| b*_Rp_pol | 0.8 | 7.0 | 5.0 | 9.1 |
| Abs172 (%) | 8.7 | 8.3 | 13.7 | 14.4 |
| PEF | 0.131 | 0.796 | 0.913 | 0.903 |
| PEF (%) | 13.1 | 79.6 | 91.3 | 90.3 |
| PEF Difference vs CE2 (%) | | | 11.7 | 10.7 |

Values indicate that the p-polarized light reflective coatings of Examples 3 and 4 were more efficient in reflecting p-polarized light, while managing an acceptable total reflection ($Rv_{(in)}$), with a p-polarizing enhancement factor of more than 90%. This showed an increase of more than 10% as compared to a p-polarized light reflective coating without ABS layer of Comparative example 2.

Absorption also increased, from a value of about 8% for Comparative example 2 up to values above 13% for Examples 3 and 4, as effected by the ABS layer of silicon.

Examples 3 and 4 and Comparative example 2 had a sheet resistance>200 Ohm/sq.

Examples 5 to 7 and Comparative Example 4

Examples 5 to 7 with silicon as absorbent material, and Comparative example 4 were simulated examples in line with Examples 3 and 4 above.

Laminated glazings were simulated, comprising a sheet of green float glass of 1.8 mm, laminated with a PVB interlayer of 0.76 mm, to a sheet of clear float glass of 1.8 mm bearing the p-polarized light reflective coating, such that the coating was positioned towards the interior of a vehicle (P4). The structures of the coatings are provided in Table 5.

Values for the parameters are indicated in Table 6.

TABLE 5

| | Thickness (nm) | | | | |
|---|---|---|---|---|---|
| Glass | TiO2 | SiO2 | ABS | TZO | SiO2 |
| Comparative Example 4 | 65 | | | | 123.5 |
| Example 5 | 63.7 | | 2 (Si) | | 123.5 |
| Example 6 | 63.7 | 5 | 2 (Si) | | 117.5 |
| Example 7 | 50 | | 1.3 (Si) | 13.7 | 125.0 |

TABLE 6

| | Comparative Example 4 | Example 5 | Example 6 | Example 7 |
|---|---|---|---|---|
| Tv (%) | 79.9 | 74.7 | 75.6 | 74.4 |
| Rv(out) (%) | 11.1 | 8.8 | 8.4 | 9.0 |
| a* Rout | −8.7 | −7.4 | −6.8 | −5.7 |
| b* Rout | −16.7 | −8.9 | −10.7 | −8.9 |
| R172(in) (%) | 11.7 | 12.3 | 11.1 | 12.2 |
| Rv(in) (%) | 17.6 | 17.9 | 17.8 | 18.6 |
| a* R172 | −7.6 | −6.6 | −6.1 | −5.1 |
| b* R172 | −20.5 | −20.1 | −19.4 | −22.1 |
| a*_Rin | 3.5 | 4.6 | 4.9 | 6.2 |
| b*_Rin | −11.5 | −11.2 | −9.1 | −9.9 |
| Rp_pol (%) | 13.1 | 15.2 | 14.7 | 15.8 |
| a*_Rp_pol | −5.2 | −5.0 | −5.0 | −5.4 |
| b*_Rp_pol | 6.0 | 3.8 | 3.5 | 3.3 |
| Abs172 (%) | 8.4 | 13.0 | 13.3 | 13.4 |
| PEF | 0.744 | 0.851 | 0.831 | 0.853 |
| PEF (%) | 74.4 | 85.1 | 83.1 | 85.3 |
| PEF Difference vs CE4 (%) | | 10.7 | 8.7 | 10.9 |

Values indicate that the p-polarized light reflective coatings of Examples 5 to 7 were more efficient in reflecting p-polarized light, while managing an acceptable total reflection ($Rv_{(in)}$), with a p-polarizing enhancement factor of more than 80%. This showed an increase of more than 8% as compared to a p-polarized light reflective coating without ABS layer of Comparative example 4.

Absorption also increased, from a value of about 8% for Comparative example up to values above 13% for Examples 5 to 7, as effected by the ABS layer of silicon.

Examples 5 to 7 and Comparative example 4 had a sheet resistance>200 Ohm/sq.

Examples 8 to 10, Comparative Examples 5 and 6

Laminated glazings were provided, comprising a sheet of green float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 7, with thicknesses of the respective layers, indicated in nm.

Examples 8 to 10 were simulated with palladium as absorbent material, each having an additional layer of oxide subsequently deposited on said palladium layer. In Example 8 and 9, the subsequent layer was a layer of high refractive index material (TZO and TiO2 respectively), such that the ABS was thus inserted within the third coating layer having a high refractive index. In Example 10, the subsequent layer was a layer of low refractive index material (AZOx), such that the ABS was inserted between the third and fourth coatings.

Comparative example 5 did not comprise any ABS layer.

Comparative example 6 comprised a silver layer with a subsequent layer of TiO2, such that the silver layer was inserted within the third coating layer having a high refractive index.

Values for the parameters are indicated in Table 8.

TABLE 7

| Thickness (nm) | TZO | ABS | Ag | TZO | TiO2 | AZOx | $SiO_2$ |
|---|---|---|---|---|---|---|---|
| Comparative Example 5 | 70.7 | | | | | | 124.4 |
| Example 8 | 65.7 | 2 (Pd) | | 5 | | | 124.4 |
| Example 9 | 63 | 2 (Pd) | | | 5 | | 124.4 |

TABLE 7-continued

| Thickness (nm) | TZO | ABS | Ag | TZO | TiO2 | AZOx | $SiO_2$ |
|---|---|---|---|---|---|---|---|
| Example 10 | 65.7 | 2 (Pd) | | | | 5 | 121.1 |
| Comparative Example 6 | 63 | | 2 (Ag) | | 5 | | 124.4 |

TABLE 5

| | Comparative Example 5 | Example 8 | Example 9 | Example 10 | Comparative Example 6 |
|---|---|---|---|---|---|
| Tv (%) | 78.8 | 71.5 | 71.6 | 71.3 | 77.4 |
| Rv(out) (%) | 12.0 | 9.5 | 9.0 | 9.2 | 12.7 |
| a* Rout | −10.5 | −9.9 | −8.7 | −9.0 | −11.4 |
| b* Rout | −12.8 | −10.0 | −10.4 | −11.7 | −13.9 |
| R172(in) (%) | 12.8 | 13.9 | 14.0 | 14.0 | 13.9 |
| Rv(in) (%) | 17.5 | 17.4 | 17.4 | 17.3 | 16.9 |
| a* R172 | −9.6 | −9.2 | −8.9 | −8.6 | −10.4 |
| b* R172 | −15.9 | −14.3 | −15.9 | −17.5 | −17.1 |
| a*_Rin | 1.6 | 1.7 | 2.3 | 2.6 | 0.3 |
| b*_Rin | −12.0 | −12.1 | −12.6 | −13.1 | −14.0 |
| Rp_pol (%) | 13.2 | 15.4 | 15.5 | 15.4 | 12.5 |
| a*_Rp_pol | −4.7 | −4.2 | −4.4 | −4.4 | −5.0 |
| b*_Rp_pol | 10.5 | 10.9 | 9.7 | 8.7 | 9.4 |
| Abs172 (%) | 8.4 | 14.6 | 14.4 | 14.7 | 8.7 |
| PEF | 0.758 | 0.886 | 0.889 | 0.887 | 0.738 |
| PEF (%) | 75.8 | 88.6 | 88.9 | 88.7 | 73.8 |
| PEF Difference vs CE5 (%) | | 12.8 | 13.1 | 12.9 | −1.5 |

Values indicate that the p-polarized light reflective coatings of Examples 8 to 10 were more efficient in reflecting p-polarized light, while managing an acceptable total reflection ($Rv_{(in)}$), with a p-polarizing enhancement factor of more than 88%. This showed an increase of more than 12% as compared to a p-polarized light reflective coating without ABS layer of Comparative example 5. Comparative example 6 showed a decrease in the p-polarizing enhancement factor as compared to Comparative example 5, as the presence of the silver actually decreased the p-polarized light reflection.

Absorption also increased, from a value of about 8% for Comparative example 5 up to values above 14% for Examples 8 to 10, as effected by the ABS layer of palladium, irrespective of its position within the coating. There is no significant impact of the silver layer on absorption in Comparative example 6, as compared to Comparative example 5 (from a value of 8.4% to a value of 8.7%).

Examples 8 to 10 and Comparative example 5 had a sheet resistance>200 Ohm/sq, while Comparative example 6 had a sheet resistance of 40 Ohm/sq.

Examples 11 to 14, Comparative Example 7

Laminated glazings were provided, comprising a sheet of green float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 9, with thicknesses of the respective layers, indicated in nm.

Examples 11 to 14 were simulated with either NiCr, NiCrW or NiCrWN as absorbent material, each being sandwiched between layers of silicon nitride, while in Example 14, only one layer of silicon nitride was deposited above the ABS layer. Example 14 comprised a fourth coating with a sublayer of $SiO_2$ covered by a sublayer of SiZrO, both low refractive index materials (n<1.7). In Example 11 to 14, the ABS is thus inserted within the third coating layer having a high refractive index, comprising the layer of TZO and the layer(s) of SiN.

Values for the parameters are indicated in Table 10.

TABLE 9

| Thickness (nm) | TZO | SiN | ABS | SiN | $SiO_2$ | SiZrO |
|---|---|---|---|---|---|---|
| Comparative Example 7 | 56.9 | 20 | | | 117.6 | |
| Example 11 | 63.6 | 10 | 1.3 (NiCr) | 10 | 106.4 | |
| Example 12 | 61 | 10 | 1.1 (NiCrW) | 10 | 109.5 | |
| Example 13 | 59.2 | 10 | 2.6 (NiCrWN) | 10 | 110.5 | |
| Example 14 | 59.2 | | 2.0 (NiCrWN) | 20 | 51.5 | 55.0 |

TABLE 10

| | Comparative Example 7 | Example 11 | Example 12 | Example 13 | Example 14 |
|---|---|---|---|---|---|
| Tv (%) | 81.6 | 72.3 | 71.1 | 70.7 | 72.9 |
| Rv(out) (%) | 9.2 | 8.2 | 7.8 | 7.6 | 7.6 |
| a* Rout | −8.0 | −8.8 | −8.3 | −8.1 | −7.3 |
| b* Rout | −10.9 | −11.5 | −11.0 | −10.3 | −9.7 |
| R172(in) (%) | 9.5 | 11.5 | 12.0 | 12.2 | 11.8 |
| Rv(in) (%) | 17.5 | 17.2 | 17.2 | 17.0 | 16.5 |
| a*_R172 | −7.8 | −7.9 | −8.0 | −8.2 | −8.8 |
| b*_R172 | −13.6 | −13.1 | −14.1 | −14.5 | −15.4 |
| a*_Rin | 3.8 | 3.8 | 3.7 | 3.6 | 3.2 |
| b*_Rin | −6.3 | −7.7 | −8.8 | −9.5 | −10.7 |
| Rp_pol (%) | 12.7 | 15.3 | 15.6 | 15.4 | 14.1 |
| a*_Rp_pol | −4.6 | −4.1 | −4.3 | −4.3 | −4.4 |
| b*_Rp_pol | 12.2 | 12.2 | 10.7 | 10.6 | 11.7 |
| Abs172 (%) | 8.8 | 16.2 | 16.9 | 17.1 | 15.3 |
| PEF | 0.723 | 0.887 | 0.908 | 0.906 | 0.854 |
| PEF (%) | 72.3 | 88.7 | 90.8 | 90.6 | 85.4 |
| PEF Difference vs CE7 (%) | | 16.4 | 18.5 | 18.3 | 13.1 |

Values indicate that the p-polarized light reflective coatings of Examples 11 to 14 were more efficient in reflecting p-polarized light, while managing an acceptable total reflection (Rv(in)), with a p-polarizing enhancement factor of more than 85%. This showed an increase of more than 13% as compared to a p-polarized light reflective coating without ABS layer of Comparative example 7.

Absorption also increased, from a value of about 8% for Comparative example 7 up to values above 15% for Examples 11 to 14, as effected by the ABS layer comprising nickel-chrome.

Examples 11 to 14 and Comparative example 7 had a sheet resistance>200 Ohm/sq. Example 14 has the additional advantage of an improved chemical resistance due to the top layer of SiZrO, as compared to other examples and comparative examples.

Examples 15 and 16, Comparative Examples 8 and 9

Laminated glazings were provided, comprising a sheet of green float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 11, with thicknesses of the respective layers, indicated in nm.

Comparative examples 8 and 9 were reproduction of Examples according to pending PCT application PCT/EP2020/086578 for p-polarized light reflective coatings, which do not contain any ABS layers.

Examples 15 and 16 were designed around Comparative examples 8 and 9, respectively, such that the coatings comprised a layer of absorbent material, namely palladium, inserted between the third and fourth coating layers.

Values for the parameters are indicated in Table 12.

TABLE 11

| Thickness (nm) | TZO | ABS | SiO2 |
|---|---|---|---|
| Comparative Example 8 | 64.6 | | 100.9 |
| Example 15 | 64.6 | 3.8 (Pd) | 100.9 |
| Comparative Example 9 | 64.8 | | 113.1 |
| Example 16 | 64.8 | 3.2 (Pd) | 113.1 |

TABLE 12

| | Comparative Example 8 | Example 15 | Comparative Example 9 | Example 16 |
|---|---|---|---|---|
| Tv (%) | 83.7 | 70.4 | 82.2 | 70.7 |
| Rv(out) (%) | 7.7 | 5.5 | 9.0 | 6.5 |
| a* Rout | 2.0 | 3.2 | −4.2 | −3.0 |
| b* Rout | −15.9 | −14.4 | −18.4 | −15.0 |
| R172(in) (%) | 7.8 | 9.8 | 9.2 | 11.3 |
| Rv(in) (%) | 21.1 | 21.7 | 18.7 | 18.8 |
| a* R172 | 3.8 | 2.6 | −2.9 | −3.5 |
| b* R172 | −19.6 | −16.3 | −22.5 | −19.7 |
| a*_Rin | 4.0 | 5.6 | 5.3 | 6.5 |
| b*_Rin | 4.9 | 6.0 | −4.9 | −5.6 |
| Rp_pol (%) | 11.9 | 16.4 | 12.7 | 16.5 |
| a*_Rp_pol | −5.5 | −4.7 | −5.5 | −4.7 |
| b*_Rp_pol | −2.3 | −0.4 | 1.9 | 3.3 |
| Abs172 (%) | 8.6 | 19.8 | 8.6 | 18.1 |
| PEF | 0.564 | 0.754 | 0.680 | 0.879 |
| PEF (%) | 56.4 | 75.4 | 68.0 | 87.9 |
| PEF Difference vs CE8 or CE9, resp. (%) | | 19.0 | | 19.8 |

Values indicate that the p-polarized light reflective coatings of Examples 15 and 16 were more efficient in reflecting p-polarized light, while managing an acceptable total reflection ($Rv_{(in)}$), with a p-polarizing enhancement factor of more than 75%. This showed an increase of 19% and more, as compared to a p-polarized light reflective coating without ABS layer of their respective Comparative examples 8 and 9.

Absorption also increased, from a value of about 8% for Comparative example 8 and 9 up to values above 18% for Examples 15 and 16, as effected by the ABS layer of palladium.

Examples 15 and 16 and Comparative examples 8 and 9 had a sheet resistance>200 Ohm/sq.

Examples 17 and 18, Comparative Example 10

Laminated glazings were provided, comprising a sheet of green float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 13, with thicknesses of the respective layers, indicated in nm Comparative example 10 was a reproduction of Example 12 according to pending PCT application PCT/EP2020/086578 for p-polarized light reflective coatings, which does not contain any ABS layers.

Examples 17 and 18 were designed around Comparative example 10, such that the coatings comprised a layer of absorbent material, namely palladium. In Example 17, the ABS layer was inserted within the third coating, while in Example 18, it was inserted between the third and fourth coatings.

Values for the parameters are indicated in Table 14.

TABLE 13

| Thickness (nm) | TrZO | SiO2 | TSO | ABS | TSO | SiO2 |
|---|---|---|---|---|---|---|
| Comparative example 10 | 11.2 | 157.7 | 64.1 | | | 123.2 |
| Example 17 | 11.2 | 157.7 | 30.0 | 0.6 (Pd) | 34.1 | 123.2 |
| Example 18 | 11.2 | 157.7 | 64.1 | 0.9 (Pd) | | 123.2 |

TABLE 14

| | Comparative example 10 | Example 17 | Example 18 |
|---|---|---|---|
| Tv (%) | 73.4 | 70.8 | 70.6 |
| Rv(out) (%) | 17.0 | 16.6 | 15.6 |
| a* Rout | −17.5 | −16.5 | −17.4 |
| b* Rout | 3.3 | 4.6 | 4.8 |
| R172(in) (%) | 18.8 | 18.8 | 19.3 |
| Rv(in) (%) | 22.6 | 21.1 | 22.7 |
| a* R172 | −17.0 | −17.5 | −15.8 |
| b* R172 | 2.6 | 3.0 | 3.5 |
| a*_Rin | 3.1 | 3.1 | 2.2 |
| b*_Rin | −14.6 | −16.2 | −13.9 |
| Rp_pol (%) | 17.4 | 17.2 | 18.5 |
| a*_Rp_pol | −13.2 | −12.7 | −12.7 |
| b*_Rp_pol | 8.2 | 9.3 | 9.4 |
| Abs172 (%) | 7.8 | 10.4 | 10.1 |
| PEF | 0.770 | 0.812 | 0.814 |
| PEF (%) | 77.0 | 81.2 | 81.4 |
| PEF Difference vs CE10 (%) | | 4.1 | 4.4 |

Values indicate that the p-polarized light reflective coatings of Examples 17 and 18 were more efficient in reflecting p-polarized light, while managing an acceptable total reflection ($Rv_{(in)}$), with a p-polarizing enhancement factor of more than 80%. This shows an increase of 4% and more, as compared to a p-polarized light reflective coating without ABS layer of Comparative example 10.

Absorption also increased, from a value of 7.8% for Comparative example 10, up to values above 10% for Examples 17 and 18, as effected by the ABS layer of palladium.

Examples 17 and 18 and Comparative example 10 had a sheet resistance>200 Ohm/sq.

Examples 19 and 20 and Comparative Example 11 and 12

Laminated glazings were provided, comprising a sheet of green float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 15, with thicknesses of the respective layers, indicated in nm.

Example 19 and 20 were designed around Comparative examples 11 and 12, respectively, such that the coatings comprised a layer of absorbent material, namely palladium. In these Examples, the ABS layer was inserted between the third and fourth coatings.

Values for the parameters are indicated in Table 16.

TABLE 15

| Thickness (nm) | TZO | SiO2 | TZO | ABS | SiO2 |
|---|---|---|---|---|---|
| Comparative Example 11 | 7 | 129 | 69 | | 98 |
| Example 19 | 7 | 129 | 69 | 3.2 (Pd) | 98 |
| Comparative Example 12 | 6 | 197 | 65 | | 114 |
| Example 20 | 6 | 197 | 65 | 3.2 (Pd) | 114 |

TABLE 16

| | Comparative Example 11 | Example 19 | Comparative Example 12 | Example 20 |
|---|---|---|---|---|
| Tv (%) | 80.2 | 70.2 | 81.7 | 70.3 |
| Rv(out) (%) | 10.9 | 8.0 | 9.4 | 6.8 |
| a* Rout | −1.8 | −0.6 | −0.5 | −0.5 |
| b* Rout | −11.2 | −13.9 | −16.0 | −12.1 |
| R172(in) (%) | 11.5 | 13.0 | 9.8 | 11.5 |
| Rv(in) (%) | 24.2 | 24.9 | 20.2 | 20.6 |
| a* R172 | 0.2 | −0.8 | 1.6 | 2.4 |
| b* R172 | −13.9 | −6.6 | −20.0 | −20.0 |
| a*_Rin | 4.5 | 4.7 | 5.3 | 5.8 |
| b*_Rin | 4.1 | 6.6 | −3.0 | −2.1 |
| Rp_pol (%) | 13.2 | 17.0 | 14.9 | 18.5 |
| a*_Rp_pol | −8.2 | −7.4 | −6.8 | −5.2 |
| b*_Rp_pol | −4.5 | −1.3 | 10.4 | 10.7 |
| Abs172 (%) | 8.3 | 16.8 | 8.5 | 18.2 |
| PEF | 0.545 | 0.681 | 0.735 | 0.899 |
| PEF (%) | 54.5 | 68.1 | 73.5 | 89.9 |
| PEF Difference vs CE11 or CE12, resp. (%) | | 13.6 | | 16.4 |

Values indicate that the p-polarized light reflective coatings of Examples 19 and 20 were more efficient in reflecting p-polarized light than their respective Comparative examples 11 and 12 respectively, while managing a similar or lower total reflection ($Rv_{(in)}$), with a p-polarizing enhancement factor of more than 68% and a p-pol reflection of 17% or more. This shows an increase of 13% and more of p-polarizing enhancement factor, as compared to a p-polarized light reflective coating without ABS layer of the respective Comparative examples.

Absorption also increased up to values above or equal to 16% for Examples 19 and 20 as affected by the ABS layer of palladium.

Examples 19 and 20 as well as their respective Comparative example 11 and 12 had a sheet resistance>100 Ohm/sq.

Example 21, Comparative Example 13

Laminated glazings were provided, comprising a sheet of clear float glass of 1.8 mm, laminated with a PVB interlayer of 0.76 mm, to a sheet of clear float glass of 1.8 mm bearing a p-polarized light reflective coating, such that the coating was positioned towards the interior of a vehicle (P4). The structures of the coatings are provided in Table 17, with thicknesses of the respective layers, indicated in nm.

Comparative example 13 was another reproduction of Example 12 according to pending PCT application PCT/EP2020/086578 for p-polarized light reflective coatings, which does not contain any ABS layers.

Example 21 was designed around Comparative example 13, such that the coatings comprised a layer of absorbent material, namely palladium. In Example 21, the ABS layer was inserted between the third and fourth coatings.

Values for the parameters are indicated in Table 18.

TABLE 17

| Thickness (nm) | TrZO | SiO2 | TSO | ABS | SiO2 |
|---|---|---|---|---|---|
| Comparative example 13 | 11.2 | 157.7 | 64.1 | | 123.2 |
| Example 21 | 11.2 | 157.7 | 64.1 | 2.6 (Pd) | 123.2 |

TABLE 18

| | Comparative example 13 | Example 21 |
|---|---|---|
| Tv (%) | 78.7 | 70.3 |
| Rv(out) (%) | 18.6 | 14.5 |
| a* Rout | −16.5 | −16.4 |
| b* Rout | 2.8 | 6.7 |
| R172(in) (%) | 19.1 | 20.6 |
| Rv(in) (%) | 24.0 | 24.2 |
| a* R172 | −16.2 | −13.0 |
| b* R172 | 2.4 | 4.2 |
| a*_Rin | 3.4 | 1.0 |
| b*_Rin | −13.4 | −11.5 |
| Rp_pol (%) | 17.5 | 20.5 |
| a*_Rp_pol | −12.9 | −11.6 |
| b*_Rp_pol | 8.1 | 11.3 |
| Abs172 (%) | 2.2 | 9.1 |
| PEF | 0.730 | 0.847 |
| PEF (%) | 73.0 | 84.7 |
| PEF Difference vs CE13 (%) | | 11.8 |

Values indicate that the p-polarized light reflective coatings of Examples 21 was more efficient in reflecting p-polarized light, while managing an acceptable total reflection ($Rv_{(in)}$), with a p-polarizing enhancement factor of 84.7%. This shows an increase of 11.8%, as compared to a p-polarized light reflective coating without ABS layer of Comparative example 13.

Absorption also increased, from a value of 2.2% for Comparative example 13, up to a values of 9.1% for Example 21, as effected by the ABS layer of palladium.

Example 21 and Comparative example 13 had a sheet resistance>100 Ohm/sq.

The previous examples are thus presenting coated substrate comprising a transparent substrate provided with a p-polarized light reflective coating shown to display the required properties for the polarization enhancement factor (PEF=ratio Rppol/Rv(in)) which render it suitable for use in a HUD system projecting p-polarized light on a windshield comprising said coated substrate such that the p-polarized light is incident on, and thus reflected from, the coated side of the coated substrate.

An IR reflecting coating comprising at least 2 metallic silver layers and 3 dielectric layers could have been deposited on the first surface of the inner pane (S3), but is not featured in the present examples. Other options might have included metallic IR reflecting films on PET within the PVB interlayer.

Asymmetric laminated constructions may be provided in the scope of the present invention, where the two glass sheets have different thicknesses. This may be provided, for example, with a glass sheet of 2.1 mm laminated with a glass sheet of 1.1 to 1.5 mm or even with ultrathin glass of 0.5 to 1 mm. Also encompassed are examples where a clear glass sheet may be laminated with a blue or grey glass sheet.

The invention claimed is:

1. A coated substrate, comprising a transparent substrate provided with a p-polarized light reflective coating, wherein the p-polarized light reflective coating comprises, in sequence starting from a substrate surface, optionally a first coating, comprising one or more layers of a high refractive index material, the first coating having a thickness of from 1 to 100 nm, optionally a second coating, comprising one or more layers of a low refractive index material, the second coating having a thickness of from 1 to 220 nm, a third coating, comprising one or more layers of a high refractive index material, the third coating having a thickness of from 40 to 150 nm, a fourth coating, comprising one or more layers of a low refractive index material, the fourth coating having a thickness of from 40 to 200 nm, and at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over values at wavelengths of 450 nm, 550 nm and 650 nm, wherein the p-polarized light reflective coating is non-conductive having a sheet resistance of >100 Ohm/Square, and wherein the absorbent layer does not comprise silver.

2. The coated substrate of claim 1, wherein the high refractive index material of the first coating and of the third coating are independently selected from at least one oxide of Zn, Sn, Ti, Nb, Zr, Ni, In, Al, Si, Ce, W, Mo, Sb, Bi and mixtures thereof, and nitrides of Si, Al, Zr, B, Y, Ce, La and mixtures thereof.

3. The coated substrate of claim 1, wherein the high refractive index material of the first optional coating and of the third coating are independently selected from an oxide of Zr, Nb, Sn, Zn and Ti, a mixed oxide of two or more of Ti, Zr, Nb, Si, Sb, Sn, Zn, and In, a nitride of Si, Zr, Al, and B, and a mixed nitride of two or more of Si, Zr, Al, and B.

4. The coated substrate of claim 1, wherein the low refractive index material of the second optional-coating and of the fourth coating are independently selected from silicon oxide, silicon oxynitride, silicon oxycarbide, aluminum oxide, mixed silicon aluminum oxide, mixed silicon zirconium oxide, aluminum doped zinc oxide, and mixtures thereof.

5. The coated substrate of claim 1, wherein the at least one first layer of absorbent material is selected from NiCr, W, Nb, Zr, Ta, Pd, Si, Ti, alloys based on Ni and/or Cr and/or W, alloys based on Cr and Zr, or on W and Zr or Cr, or on W and Ta, optionally including an additional element selected from Ti, Nb, Ta, Ni and Sn; and from TiN, CrN, WN, NbN, TaN, ZIN, NiCrN, NiCrWN, and a mixture of these nitrides.

6. The coated substrate of claim 1, wherein the at least one first layer of absorbent material is provided with at least one barrier layer.

7. The coated substrate of claim 1, wherein the at least one first layer of absorbent material is inserted between at least two adjacent coatings of the said first, second, third or fourth coatings, or inserted within at least one of the said first, second, third or fourth coatings.

8. The coated substrate of claim 1, further comprising a second layer of absorbent material, distinct from the at least one first layer of absorbent material, wherein the second layer of absorbent material is inserted between two adjacent layers of dielectric of at least one of the said first, second, third or fourth coatings or inserted within at least one of the said first, second, third or fourth coatings, wherein a location of the second layer of absorbent material is different from a location of the at least one first layer of absorbent material.

9. A laminated glazing, comprising:

an outer pane having a first surface and a second surface; and an inner pane having a first surface and a second surface, wherein the outer pane and inner pane are bonded by at least one sheet of interlayer material providing contact between the first surface of the inner pane and the second surface of the outer pane, wherein the inner pane is a coated substrate comprising a transparent substrate provided with a p-polarized light reflective coating on its second surface, wherein the p-polarized light reflective coating comprises, in sequence starting from a substrate surface, optionally a first coating, comprising one or more high refractive index layers, the first coating having a thickness of from 1 to 100 nm, optionally a second coating, comprising one or more low refractive index layers, the second coating having a thickness of from 1 to 220 nm, a third coating, comprising one or more high refractive index layers, the third coating having a thickness of from 40 to 150 nm, a fourth coating, comprising one or more low refractive index layers, the fourth coating having a thickness of from 40 to 200 nm, and at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over values at wavelengths of 450 nm, 550 nm and 650 nm, wherein the p-polarized light reflective coating is non-conductive having a sheet resistance of >100 Ohm/Square, and wherein the absorbent layer does not comprise silver.

10. The laminated glazing of claim 9, further comprising an infrared reflective coating comprising n IR reflective functional layer-based layers and n+1 dielectric layers, wherein each IR reflective functional layer based layer is located between two dielectric layers on at least one of the first surface of the inner pane, the second surface of the outer pane, or embedded in the at least one sheet of interlayer material.

11. A head up display (HUD) system, comprising:

a light source projecting p-polarized light towards a laminated glazing, wherein said laminated glazing comprises an outer pane having a first surface and a second surface, and an inner pane having a first surface and a second surface, wherein the outer pane and inner pane are bonded by at least one sheet of interlayer material providing contact between the first surface of the inner pane and the second surface of the outer pane, wherein the inner pane is a coated substrate comprising a transparent substrate provided with a p-polarized light reflective coating on its second surface, wherein the p-polarized light reflective coating comprises in sequence starting from a substrate surface, optionally a first coating, comprising one or more high refractive index layers, the first coating having a thickness of from 1 to 100 nm, optionally a second coating, comprising one or more low refractive index layers, the second coating having a thickness of from 1 to 220 nm, a third coating, comprising one or more high refractive index layers, the third coating having a thickness of from 40 to 150 nm, a fourth coating, comprising one or more low refractive index layers, the fourth coating having a thickness of from 40 to 200 nm, and at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over values at wavelengths of 450 nm, 550 nm and 650 nm, wherein the p-polarized light reflective coating is non-conductive having a sheet resistance of >100 Ohm/Square, and wherein the absorbent layer does not comprise silver.

12. The HUD system of claim 11, wherein a projected light is incident to the laminated glazing at an angle of 42 to 72 degrees.

13. A method of providing information with a HUD system, comprising:

projecting p-polarized light at an angle of incidence on a glazing of 42 to 72° to reflect the p-polarized light, wherein the HUD system comprises a coated substrate comprising a transparent substrate provided with a p-polarized light reflective coating, and a p-polarized light source, wherein the p-polarized light reflective coating comprises in sequence starting from a substrate surface, optionally a first coating, comprising one or more high refractive index layers, the first coating having a thickness of from 1 to 100 nm, optionally a second coating, comprising one or more low refractive index layers, the second coating having a thickness of from 1 to 220 nm, a third coating, comprising one or more high refractive index layers, the third coating having a thickness of from 40 to 150 nm, a fourth coating, comprising one or more low refractive index layers, the fourth coating having a thickness of from 40 to 200 nm, and further comprising at least one first layer of absorbent material, said at least one first layer of absorbent material having a thickness of from 0.2 to 15 nm, and said absorbent material having an average refractive index n above 1 and an average extinction coefficient k above 0.1, with the averages n and k calculated over values at wavelengths of 450 nm, 550 nm and 650 nm, wherein the p-polarized light reflective coating is non-conductive having a sheet resistance of >100 Ohm/Square, and wherein the absorbent layer does not comprise silver.

14. The coated substrate of claim 1, wherein the p-polarized light reflective coating has an emissivity of >0.5.

15. The laminated glazing of claim 9, wherein the p-polarized light reflective coating has an emissivity of >0.5.

16. The head up display (HUD) system of claim 11, wherein the p-polarized light reflective coating has an emissivity of >0.5.

17. The method of providing information with a HUD system of claim 13, wherein the p-polarized light reflective coating has an emissivity of >0.5.

18. The coated substrate of claim 1, wherein said at least one first layer of absorbent material has a thickness of from 2 to 12 nm.

19. The coated substrate of claim 1, wherein a polarization enhancement factor (PEF) Rp−pol/Rv(in) (%) (p-polarized light reflection/interior reflection in the visible range) increases by at least 6%, as compared to an otherwise identical p-polarized reflective coating without the at least one layer of absorbent material, at an incident angle of the p-polarized light of from 42 to 72°.

20. The coated substrate of claim 5, wherein the at least one first layer of absorbent material does not include Pd.

* * * * *